United States Patent [19]

Mishima

[11] Patent Number: 5,498,213

[45] Date of Patent: Mar. 12, 1996

[54] POWER TRANSMISSION BELT

[75] Inventor: Kyoichi Mishima, Suzurandaihigashi, Japan

[73] Assignee: Mitsuboshi Belting Ltd., Kobe, Japan

[21] Appl. No.: 356,143

[22] Filed: Dec. 15, 1994

[51] Int. Cl.⁶ .................................................. F16G 5/08
[52] U.S. Cl. ............................................................. 474/263
[58] Field of Search .................................... 474/263–268, 474/237, 238

[56] References Cited

U.S. PATENT DOCUMENTS

| | | |
|---|---|---|
| 4,798,566 | 1/1989 | Sedlacek . |
| 5,197,928 | 3/1993 | Mishima et al. . |
| 5,413,538 | 5/1995 | Mishima ................................. 474/263 |
| 5,415,594 | 5/1995 | Kitahama et al. ...................... 474/263 |

FOREIGN PATENT DOCUMENTS 113940  5/1987  Japan .

*Primary Examiner*—Michael Powell Buiz
*Attorney, Agent, or Firm*—Wood, Phillips, VanSanten, Clark & Mortimer

[57] ABSTRACT

A power transmission belt having a body with a length and laterally spaced side surfaces, a first plurality of laterally extending discrete fibers embedded in the body and having portions projecting from the side surfaces, and a second plurality of discrete pulp-like fibers intermixed with the first plurality of laterally extending discrete fibers. The fibers in the first plurality of laterally extending discrete fibers have at least one of a) a different composition and b) a different texture than the fibers in the second plurality of discrete fibers.

22 Claims, 2 Drawing Sheets

POWER TRANSMISSION BELT

BACKGROUND OF THE INVENTION

1. Field of the Invention

This invention relates to power transmission belts and, more particularly to a power transmission belt having discrete reinforcing fibers embedded therein and projecting from pulley-engaging side surfaces on the belt.

2. Background Art

It is well known to construct power transmission belts with one or more V-shaped fibs to engage a cooperating pulley having complementary grooves. It is also known to embed short fibers in the compression rubber layer which has exposed surfaces that engage cooperating pulleys. These short reinforcing fibers are typically oriented laterally of the belt body to give the compression rubber layer the necessary amount of lateral rigidity. It is also known to cause portions of the short fibers to protrude from the belt at the side surfaces which frictionally engage the pulleys, to thereby improve wear resistance. These protruding fibers change the frictional characteristics of the side surfaces and additionally reduce noise that is generated between the belt and pulleys attributable to the tackiness of the belt side surfaces.

Japanese Patent Laid-Open No. 164839/1989 discloses a power transmission belt with aramid fibers embedded therein and protruding slightly from the pulley-engaging side surfaces on the belt. Because the aramid fibers are known to be highly durable, wear resistance at the side surfaces is enhanced.

Because aramid fibers are highly resistant to wear, they have been widely used for reinforcement purposes in power transmission belts. Only a small amount of the aramid fibers is necessary to provide the requisite reinforcement. However, when the amount of aramid fibers is small, and there is little protrusion of the fibers at the belt sides, there is a substantial contact area between the belt rubber and the cooperating pulleys. As a result, in mounting the belts, as on an automotive engine without a belt tensioner, problems with wear and sticking between the compression rubber layer and pulleys become significant.

To overcome this problem, it is known to cause the short aramid fibers embedded in the belt body to protrude substantially in the region that contacts the cooperating pulleys. As the belt is operated on a pulley system, the pulley causes the protruding portions of the aramid fibers to bend against the side surfaces of the body. As this occurs, the protruding fiber portions cover a substantial portion, if not all, of the pulley-engaging side surfaces. This protects the side surfaces against wear after long periods of use. The problem of sticking between the belt and pulley is alleviated, even at high tensions. These benefits are realized even though the amount of short, aramid fibers may be relatively small.

However, after the belt is run for a long period of time, the protruding portions of the aramid fibers tend to embed and become buried in the side surfaces by reason of repeated contact with the pulleys. As a result, parts of the embedded fibers may remain exposed at the pulley-engaging side surfaces through a substantial portion of the belt life.

With the belt highly tensioned, and there being no tensioning device, the tension on the belt reduces over time. The belt then becomes prone to slippage. The embedded and exposed aramid fibers result in a reduced coefficient of friction between the belt and pulley compared to a belt in which the robber on the side surfaces is fully exposed. There results a detrimental synergistic effect. That is, the belt is prone to slipping, has reduced power transmission capability, and at the same time generates noise in operation.

The above slippage problem can be avoided by preventing burying of the bent, protruding portions of the fibers in the side surfaces. This can be achieved by increasing the amount of short aramid fibers, which in turn increases the concentration of fibers exposed at the side surfaces. The exposed fibers prevent burying of the protruding fiber portions in the robber. With this arrangement, the protruding fibers ultimately are cut off due to the friction between the belt and pulley. As this occurs, the area of exposed robber increases, as does the coefficient of friction, so that slippage is prevented. However, simply increasing the amount of short aramid fibers results in an increase in the hardness of the compression robber layer, which in turn leads to slippage.

SUMMARY OF THE INVENTION

It is an objective of the present invention to provide a power transmission belt in which fibers are allowed to protrude from the side surfaces of the belt to prevent sticking between the belt and pulley with the belt under high tension, and maintain high power transmission capability, even with the belt under a relatively low tension, without generating significant amounts of noise.

In one form of the invention, a power transmission belt is provided having a body with a length and laterally spaced side surfaces, a first plurality of laterally extending discrete fibers embedded in the body and having portions projecting from the side surfaces, and a second plurality of discrete pulp-like fibers intermixed with the first plurality of laterally extending discrete fibers. The fibers in the first plurality of laterally extending discrete fibers have at least one of a) a different composition and b) a different texture than the fibers in the second plurality of discrete fibers.

The fibers in the first plurality of laterally extending discrete fibers may be at least one of meta-type and para-type aramid fiber.

The fibers in the first plurality of laterally extending discrete fibers may be at least one of polyparaphenylene isophthalamide, polymetaphenylene isophthalamide, fibers sold commercially under the trademark KEVLAR™, fibers sold commercially by Teijin under the trademark TECHNORA™, and fibers sold commercially by Enka of Holland under the trademark TWARON™.

The first plurality of laterally extending discrete fibers preferably have a length of 2–10 mm.

In one form, the body has a portion thereof that is made from robber. The first plurality of laterally extending discrete fibers are embedded in the robber and present in an amount of 5–10 weight parts per 100 weight parts of robber.

In one form, the fibers in the second plurality of discrete fibers are para-type aramid fibers.

The fibers in the second plurality of discrete fibers may be at least one of polyparaphenylene isophthalamide, fibers sold commercially by DuPont under the trademark KEVLAR™, fibers sold commercially by Teijin under the trademark TECHNORA™, and fibers sold commercially by Enka of Holland under the trademark TWARON™.

The fibers in the second plurality of discrete fibers may have a length that is not greater than 2 mm. In one form, at least 80% of the fibers in the second plurality of discrete fibers have a length that is not greater than 1 min.

The fibers in the second plurality of discrete fibers may be embedded in the robber and present in an amount of 1–5 weight parts per 100 weight parts of robber.

In one form, the fibers in the second plurality of discrete fibers have exposed surfaces that are robbed to fibrillate these surfaces.

The fibers in the second plurality of discrete fibers may have a multitude of whisker-like free fibers projecting therefrom and having a length of 1–2 mm.

The fibers in the second plurality of discrete fibers may be randomly oriented in the body.

In one form, the power transmission belt has a compression section, with the first plurality of laterally extending discrete fibers and the second plurality of discrete fibers both being in the compression section.

A cushion robber layer may be provided with a load carrying cord embedded therein, with the compression layer being inside of the cushion robber layer.

The robber on the belt body may be at least one of CR, NBR, H-NBR, CSM, NR, SBR, and BR.

The belt according to the present invention may be a V-belt, a V-fibbed belt, or other belt with exposed, laterally facing side surfaces to engage a cooperating pulley.

In another form of the invention, a power transmission belt is provided having a body with a length and laterally spaced side surfaces, with at least a portion of the body being made from an elastomeric material, a first plurality of laterally extending discrete aramid fibers embedded in the elastomeric material on the body and having portions projecting from the side surfaces, with the portions of the laterally extending discrete aramid fibers projecting from the side surfaces having a sufficient length to be bendable against the side surfaces, and structure on the elastomeric material in addition to the first plurality of laterally extending discrete aramid fibers for preventing the portions of the laterally extending discrete aramid fibers projecting from the side surfaces from embedding in the elastomeric material as they are bent against the side surfaces.

The structure for preventing the portions of the laterally extending, discrete aramid fibers projecting from the side surfaces from embedding may be a second plurality of discrete fibers having at least one of a) a different composition and b) a different texture than the fibers in the first plurality of laterally extending discrete aramid fibers and embedded in the elastomeric material.

DETAILED DESCRIPTION OF THE DRAWINGS

Figure 1:
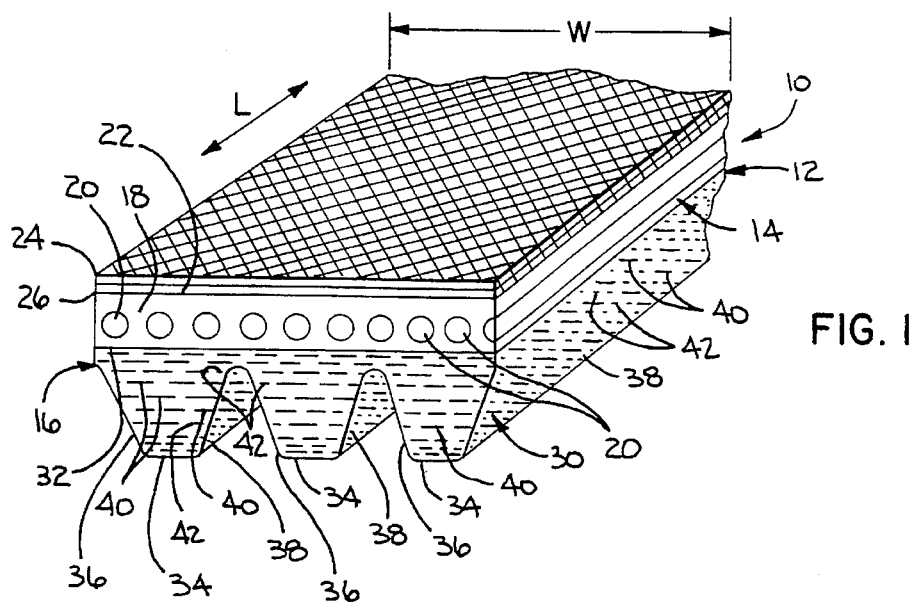
FIG. 1 is a fragmentary perspective view of a V-ribbed power transmission belt made according to the present invention.

In FIG. 1, a V-ribbed belt is shown at 10, with the present invention incorporated therein. It should be understood that the inventive concept can be practiced in other types of belts, i.e. a V-belt or other belt utilizing oppositely facing side surfaces to frictionally engage a cooperating pulley. The belt 10 has a body 12 with a length in the direction of the double-headed arrow L and a width W between two laterally oppositely facing surfaces 14, 16.

The belt 10 has a cushion rubber layer 18 within which longitudinally extending, load carrying cords 20 are embedded. The cushion rubber layer 18 is preferably formed from at least one of CR, NBR, H-NBR, CSM, NR, SBR, BR, or the like. The outside surface 22 of the cushion rubber body 12 is covered by one, and in this case two, canvas sheets 24, 26.

The load carrying cords 20, embedded in the cushion rubber layer 18, are constructed to have high strength and good resistance to elongation.

A compression rubber section/layer 30 is formed on the bottom surface 32 of the cushion rubber layer 18. The compression rubber layer 30 can be made from the same type of rubber as makes up the cushion rubber layer 18.

The compression rubber layer 30 has a plurality, and in this case three, longitudinally extending, V-shaped ribs 34. Each of the ribs 34 has laterally oppositely facing, pulley-engaging side surfaces 36, 38. It is these surfaces 36, 38 that frictionally engage cooperating pulleys to cause the belt 10 to drive and be driven by the cooperating pulleys.

Short aramid fibers are embedded in the compression rubber layer 30, and principally in the ribs 34, to provide lateral reinforcement. These aramid fibers consist of para- and/or meta-type aramid fibers 40 and pulp-like para-type aramid fibers 42, with the fibers 40 extending substantially in the lateral direction and the fibers 42 being randomly oriented.

The para- and/or meta-type aramid fibers 40 preferably have a length of 2–10 mm and are present in an amount of 5–10 weight parts per 100 weight parts of rubber.

The pulp-like para-type aramid fibers 42 have a length that is not greater than 2 mm. More preferably, 80% or more of these fibers 42 have a length that does not exceed 1 mm. The pulp-like para-type aramid fibers 42 are present in an amount of 1–5 weight parts per 100 weight parts of rubber.

The fibers 40, 42 are incorporated so that they have portions that protrude from the pulley-engaging side surfaces 36, 38. Preferably, the projection of at least the para- and/or meta-type aramid fibers 40 is sufficient that the projecting portions of the fibers 40 can bend against the side surfaces 36, 38 in operation as they contact a cooperating pulley.

When the length of the fibers 40 is less than 2 mm, the fibers 40 do not provide the necessary lateral reinforcement. On the other hand, when the length of the fibers exceeds 10 mm, the fibers 40 become entangled with each other during the kneading process. This results in fiber clusters which remain intact in the rubber. These fiber clusters are not easily untangled during the subsequent kneading, rolling, etc. steps and remain in the vulcanized rubber, thereby causing localized weakening and making the belt prone to cracking.

The pulp-like para-type aramid fibers 42 have the length described above in that fibers of greater length tend to inhibit bending of the belt. Characterization of the para-type fibers 42 as "pulp-like" means that the fibers have a multitude of whisker-like fine fibers, having a length of approximately 1–2 mm, projecting therefrom. This texture can be achieved by rubbing para-type aramid fibers using a known technique so as to fibrillate the exposed surface of the fibers. These whisker-like free fibers can be generated by treating para-type aramid fibers, but cannot be generated effectively using meta-type aramid fibers.

Examples of suitable para-type aramid fibers are polyparaphenylene isophthalamide, fibers sold commercially by DuPont under the trademark KEVLAR™, fibers sold commercially by Teijin under the trademark TECHNORA™, and fibers sold commercially by Enka of Holland under the trademark TWARON™.

One suitable meta-type aramid short fiber is polymetaphenylene isophthalamide, fibers sold commercially by Teijin Ltd. under the trademark CONEX™, and fibers sold commercially by DuPont under the trademark NOMEX™.

The whisker-like free fibers on the pulp-like short fibers 42 are rooted principally in the compression rubber layer 30 and reinforce the side surfaces 36, 38 on the belt 10. At the same time, these fibers 42 cooperate with the fibers 40 to provide a unique effect.

More particularly, the para- and/or meta-type aramid fibers 40 protruding from the side surfaces 36, 38, upon being bent by a cooperating pulley against the side surfaces 36, 38, are prevented by the pulp-like para-type aramid fibers 42 from being embedded in the rubber on the side surfaces 36, 38. With the belt 10 initially at high tension, the exposed fibers 40, 42 prevent excessive wear and sticking between the belt side surfaces 36, 38 and a cooperating pulley. After continuous running, the bent portions of the fibers 40, which cannot penetrate the side surfaces 36, 38, sever by reason of the friction between the belt and cooperating pulleys, thereby exposing more of the elastomeric material to increase the coefficient of friction between the belt 10 and a cooperating pulley.

The following testing demonstrates the advantages of the invention. For purposes of this testing, a V-ribbed belt construction was utilized.

INVENTIVE BELT

A V-ribbed belt 10 (3PK1100) was made having incorporated therein 10 parts by weight of meta-type aramid fiber 40 with a length of 3 mm. 5 parts by weight of pulp-like para-type aramid fibers 42 was incorporated for each 100 parts by weight of rubber.

COMPARATIVE BELT A

This belt was constructed by incorporating 15 parts by weight of short meta-type aramid fibers, with a length of 3 mm, per 100 parts by weight of rubber.

COMPARATIVE BELT B

This belt was constructed by incorporating 10 parts by weight of short meta-type aramid fibers, with a length of 3 mm, per 100 parts by weight of rubber.

TACKINESS TEST

Figure 2:
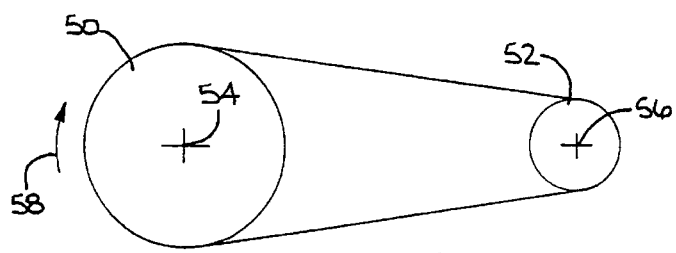
FIG. 2 is a schematic representation of a system for dynamically testing belt sticking with the belt under high tension.

Each of the V-ribbed belts was trained around a system as shown in FIG. 2 including a drive pulley 50 and a driven pulley 52 spaced from each other and rotatable about parallel axes 54, 56 respectively. The drive pulley 50 had a 170 mm diameter, while the driven pulley 52 had a 72 mm diameter. The belts were run for 20 minutes while varying the tension on the belt. The drive pulley 50 was rotated in the direction of the arrow 58 at a speed of 2000 rpm.

The results of the tests are shown in Table 1, below.

TABLE 1

| Mounting Tension (kgf/rib) | 15 | 20 | 25 | 30 |
|---|---|---|---|---|
| Inventive Belt | O | O | O | O |

TABLE 1-continued

| Mounting Tension (kgf/rib) | 15 | 20 | 25 | 30 |
|---|---|---|---|---|
| Comparative Belt A | O | O | X | X |
| Comparative Belt B | O | O | O | X |

As can be seen from the test results, when the belt tension was low, there was no tackiness problem with any of the belts. When the belt tension was increased, no problem was observed with the inventive belt. However, both of the conventional belts had some observable tackiness at the higher tensions.

POWER TRANSMISSION TEST

In a conventional belt, when aramid fibers are incorporated so as to protrude from the belt side surfaces, the frictional forces between the belt and cooperating pulleys is reduced over what they would be in the absence of the protruding fibers. When belt tension decreases after an extended period of running, reduction in power transmission efficiency results by reason of slippage. Unwanted noise is generated.

On the other hand, with the inventive belt, the short fibers 40 cannot bury in the side surfaces 36, 38 in the compression rubber layer, regardless of the running time, due to the presence of the whiskers of the pulp-like fibers 42 in the compression rubber layer 30. As a result, the bent protruding portions of the fibers 40 are ultimately severed from the side surfaces 36, 38 by reason of the frictional forces between the belt 10 and cooperating pulleys. More rubber is thus exposed on the side surfaces 36, 38 resulting in an increased coefficient of friction. Accordingly, wear is reduced, transmission efficiency is maintained, and noise generation becomes insignificant.

To verify the above, the following dynamic testing was conducted using the inventive belt.

A V-ribbed belt (3PK1100) was made using 10 parts by weight meta-type aramid fiber 40. The fibers 40 had a length of 3 mm and were present in an amount of 10 weight parts per 100 weight parts of rubber. 5 weight parts of pulp-like, para-type aramid fiber 42 were incorporated per 100 weight parts of rubber.

Figure 3:
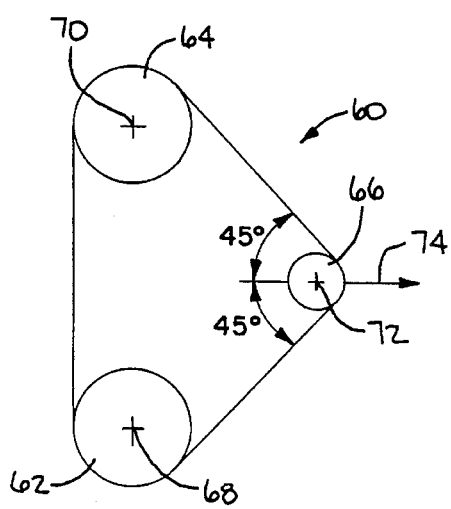
FIG. 3 is a schematic illustration of a system for dynamically testing the power transmission capability of a belt.

Test data was taken for the belt both before and after running on the dynamic system at 60 in FIG. 3. The system 60 included a drive pulley 62, a driven pulley 64 and a tensioning pulley 66. The pulleys 62, 64, 66 were rotated about substantially parallel axes 68, 70, 72, respectively. The drive pulley 62 had a 120 mm diameter, the driven pulley 64 a 120 mm diameter, and the tensioning pulley 66 a 45 mm diameter.

The drive pulley 62 was rotated at 4900 rpm, with the load on the driven shaft being 12 PS. A tension of 559N was applied in the direction of the arrow 74. The system was operated with the temperature at 85° C.

The belt was examined both prior to, and after, being run for 48 hours on the system in FIG. 3.

Figure 4:
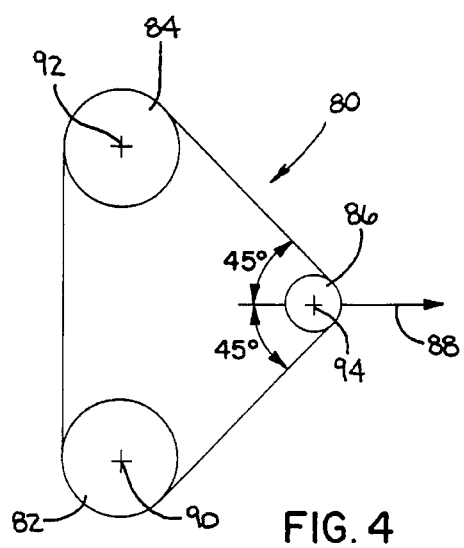
FIG. 4 is a schematic illustration of a dynamic test system for measuring slip ratio with respect to load for a belt.

Slippage measurements were taken after running each belt on the system shown at 80 in FIG. 4 for 48 hours. The system 80 included a drive pulley 82 having a 120 mm diameter, a driven pulley 84 having a 120 mm diameter, and a tensioning pulley 86, having a 45 mm diameter with a tension of 208N applied thereto in the direction of the arrow 88. The pulleys 82, 84, 86 were rotated about substantially parallel axes 90, 92, 94, respectively. The system was operated at room temperature and the slip ratio with respect to each load was measured, with the results being shown in FIG. 5.

Figure 5:
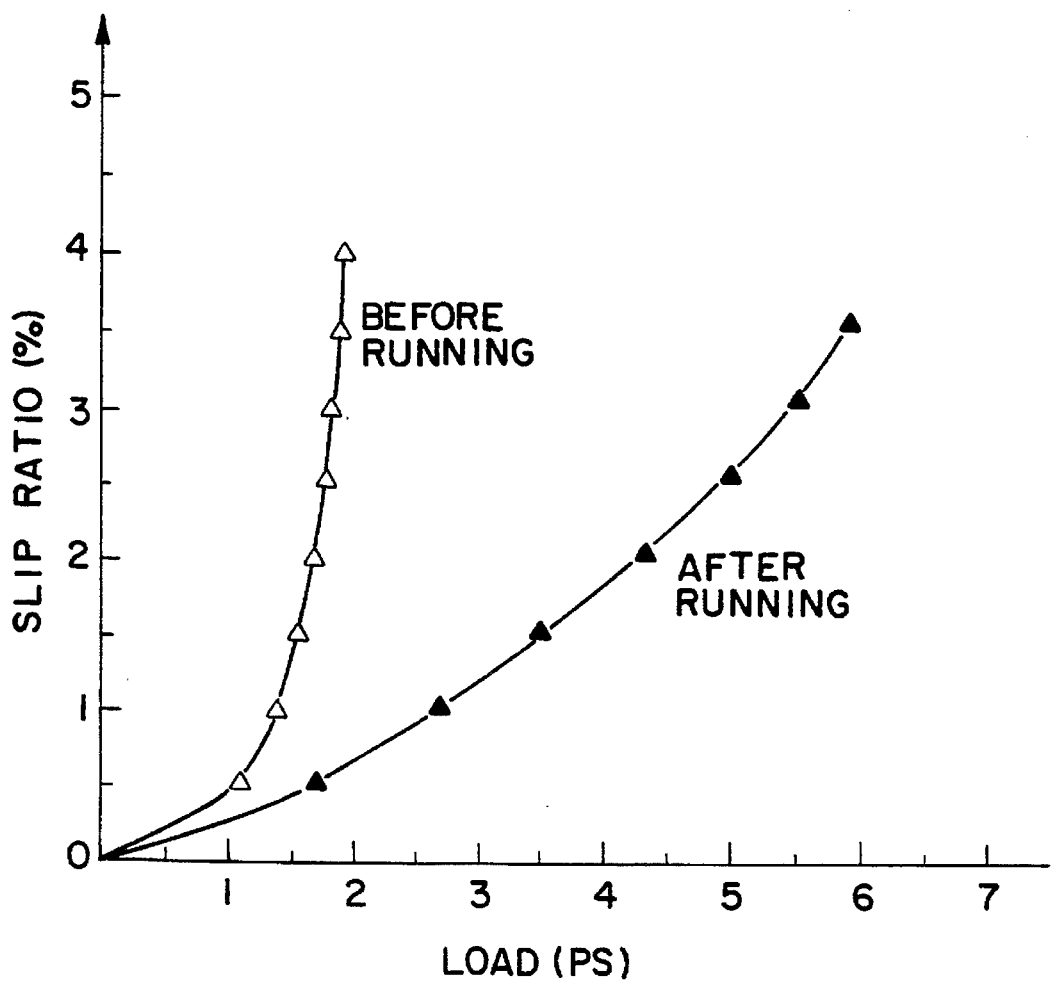
FIG. 5 is a graph of slip ratio for different loads on a belt.

Analyzing the data in FIG. 5, it can be seen that the slip ratio with respect to the load is larger after being run for 48 hours than prior to running. It is assumed that this is due to the fact that, prior to running on the system 80, the short fibers protruding from the side surfaces of the belt are not buried in the rubber and separate from the belt after running.

In the case of a power transmission system having no tensioning device, a decrease in tension occurs as the belt conforms to the pulley grooves i.e. seats, with the result that the slip ratio tends to increase. With the inventive belt, as the belt seats, i.e. moves further radially inwardly in the pulley groove, the short fibers separate from the belt so that the decrease in tension is compensated for by an increase in frictional coefficient.

The foregoing disclosure of specific embodiments is intended to be illustrative of the broad concepts comprehended by the invention.

I claim:

1. A power transmission belt comprising:

a body having a length and laterally spaced side surfaces;

a first plurality of laterally extending discrete fibers embedded in the body and having portions projecting from the side surfaces; and a second plurality of discrete pulp-like fibers intermixed with the first plurality of laterally extending discrete fibers, wherein the fibers in the first plurality of laterally extending discrete fibers have at least one of a) a different composition and b) a different texture than the fibers in the second plurality of discrete fibers.

2. The power transmission belt according to claim 1 wherein the fibers in the first plurality of laterally extending discrete fibers comprise at least one of a meta-type and para-type aramid fiber.

3. The power transmission belt according to claim 1 wherein the fibers in the second plurality of discrete fibers comprise para-type aramid fibers.

4. The power transmission belt according to claim 1 wherein the power transmission belt has a compression section and the first plurality of laterally extending discrete fibers and the second plurality of discrete fibers are both in the compression section.

5. The power transmission belt according to claim 2 wherein the fibers in the first plurality of laterally extending discrete fibers have a length of 2–10 mm.

6. The power transmission belt according to claim 3 wherein the fibers in the second plurality of discrete fibers have a length that is not greater than 2 mm.

7. The power transmission belt according to claim 6 wherein at least 80% of the fibers in the second plurality of discrete fibers have a length that is not greater than 1 mm.

8. The power transmission belt according to claim 1 wherein the fibers in the second plurality of discrete fibers are randomly oriented in the body.

9. The power transmission belt according to claim 2 wherein the body has a portion thereof that is made from rubber, the first plurality of laterally extending discrete fibers are embedded in the rubber and present in an amount of 5–10 weight parts per 100 weight parts of rubber.

10. The power transmission belt according to claim 3 wherein the body has a portion thereof that is made from rubber, the fibers in the second plurality of discrete fibers are embedded in the rubber and present in an mount of 1–5 weight pans per 100 weight parts of rubber.

11. The power transmission belt according to claim 1 wherein the power transmission belt is one of a V-belt and a V-ribbed belt.

12. The power transmission belt according to claim 9 wherein the rubber comprises at least one of CR, NBR, H-NBR, CSM, NR, SBR, and BR.

13. The power transmission belt according to claim 1 wherein the fibers in the second plurality of discrete fibers have exposed surfaces that are rubbed to fibrillate the exposed surfaces on the second plurality of discrete fibers.

14. The power transmission belt according to claim 1 wherein the fibers in the second plurality of discrete fibers have a multitude of whisker-like fine fibers projecting therefrom and having a length of 1–2 mm.

15. The power transmission belt according to claim 1 wherein the fibers in the first plurality of laterally extending discrete fibers comprise at least one of polyparaphenylene isophthalamide, polymetaphenylene isophthalamide, fibers sold commercially under the trademark KEVLAR™, fibers sold commercially by Teijin under the trademark TECHNORA™, and fibers sold commercially by Enka of Holland under the trademark TWARON™.

16. The power transmission belt according to claim 1 wherein the fibers in the second plurality of discrete fibers comprise at least one of polyparaphenylene isophthalamide, fibers sold commercially by DuPont under the trademark KEVLAR™, fiber sold commercially by Teijin under the trademark TECHNORA™, and fibers sold commercially by Enka of Holland under the trademark TWARON™.

17. The power transmission belt according to claim 1 wherein the body has an inside and an outside, a cushion rubber layer, a load carrying cord embedded in the cushion rubber layer, and a compression layer inside of the cushion rubber layer, said first plurality of laterally extending discrete fibers and second plurality of discrete fibers being embedded in the compression layer.

18. A power transmission belt comprising:

a body having a length and laterally spaced side surfaces, at least a portion of the body being made from an elastomeric material;

a first plurality of laterally extending discrete aramid fibers embedded in the elastomeric material in the body and having portions projecting from the side surfaces, the portions of the laterally extending discrete aramid fibers projecting from the side surfaces having a sufficient length to be bendable against the side surfaces; and means on the elastomeric material in addition to the first plurality of laterally extending discrete aramid fibers for preventing the portions of the laterally extending discrete aramid fibers projecting from the side surfaces from embedding in the elastomeric material as they are bent against the side surfaces.

19. The power transmission belt according to claim 18 wherein the means for preventing comprises a second plurality of discrete fibers having at least one of a) a different composition and b) a different texture than the fibers in the first plurality of laterally extending discrete aramid fibers and embedded in the elastomeric material.

20. The power transmission belt according to claim 19 wherein the fibers in the second plurality of discrete fibers comprise rubbed para-type aramid fibers.

21. The power transmission belt according to claim 20 wherein the fibers in the first plurality of laterally extending discrete aramid fibers have a length of 2–10 mm and are present in the elastomeric material in an amount of 5–10 weight parts per 100 weight pans of elastomeric material and the fibers in the second plurality of discrete fibers have a length of not greater than 2 mm with 80% of the fibers in the second plurality of discrete fibers having a length of not greater than 1 mm and being present in the elastomeric material an amount of 1–5 weight parts per 100 weight parts of elastomeric material.

22. The power transmission belt according to claim 18 wherein the body has an inside and an outside, a cushion rubber layer, a load carrying cord embedded in the cushion rubber layer, and a compression layer inside of the cushion rubber layer, said first plurality of laterally extending discrete aramid fibers and second plurality of discrete fibers being embedded in the compression layer.

* * * * *